US012722728B2

(12) United States Patent
Bender

(10) Patent No.: US 12,722,728 B2
(45) Date of Patent: Sep. 1, 2026

(54) DOOR DESIGNS FOR RECREATIONAL VEHICLES

(71) Applicant: Winnebago Industries, Inc., Eden Prairie, MN (US)

(72) Inventor: Stephen Bender, Mason City, IA (US)

(73) Assignee: Winnebago Industries, Inc., Eden Prairie, MN (US)

( * ) Notice: Subject to any disclaimer, the term of this patent is extended or adjusted under 35 U.S.C. 154(b) by 340 days.

(21) Appl. No.: 18/432,405

(22) Filed: Feb. 5, 2024

(65) Prior Publication Data

US 2024/0300596 A1 Sep. 12, 2024

Related U.S. Application Data

(60) Provisional application No. 63/450,400, filed on Mar. 7, 2023.

(51) Int. Cl.

| | |
|---|---|
| ***B62D 65/06*** | (2006.01) |
| ***B60J 1/10*** | (2006.01) |
| ***B60J 5/04*** | (2006.01) |
| ***B60J 5/06*** | (2006.01) |
| ***B60L 50/60*** | (2019.01) |
| ***B60P 3/32*** | (2006.01) |
| ***E05D 15/06*** | (2006.01) |
| ***E05F 1/10*** | (2006.01) |
| *B60R 3/02* | (2006.01) |

(52) U.S. Cl.

CPC ................ *B62D 65/06* (2013.01); *B60J 1/10* (2013.01); *B60J 5/0473* (2013.01); *B60J 5/0479* (2013.01); *B60J 5/06* (2013.01); *B60L 50/60* (2019.02); *B60P 3/32* (2013.01); *E05D 15/0621* (2013.01); *E05F 1/1091* (2013.01); *B60R 3/02* (2013.01); *E05Y 2900/512* (2013.01); *E05Y 2900/531* (2013.01)

(58) Field of Classification Search

CPC . B62D 65/06; B60J 1/10; B60J 5/0473; B60J 5/0479; B60J 5/06; B60P 3/32; E05D 15/0621; E05F 1/1091; B60L 50/60

See application file for complete search history.

(56) References Cited

U.S. PATENT DOCUMENTS

| | | | | |
|---|---|---|---|---|
| 10,384,519 | B1 * | 8/2019 | Brown | E05F 15/649 |
| 10,583,717 | B2 * | 3/2020 | Hoggarth | B60J 5/06 |
| 11,220,852 | B2 * | 1/2022 | Groninga | B64C 1/1423 |
| 11,332,081 | B2 * | 5/2022 | Choi | B60J 5/0479 |
| 11,745,567 | B2 * | 9/2023 | Patel | B60J 5/0459 296/146.9 |
| 12,104,422 | B1 * | 10/2024 | Mapson | E05F 15/646 |
| 12,151,544 | B2 * | 11/2024 | Kanasugi | E05B 77/46 |

(Continued)

FOREIGN PATENT DOCUMENTS

| | | | | |
|---|---|---|---|---|
| DE | 102022210611 A1 * | 6/2023 | | E05D 3/127 |
| DE | 102022004589 B3 * | 8/2023 | | B60J 5/0473 |

(Continued)

*Primary Examiner* — Faye M Fleming

(74) *Attorney, Agent, or Firm* — Faegre Drinker Biddle & Reath LLP

(57) ABSTRACT

A recreational vehicle includes a body with an entryway to an interior of the recreational vehicle. A first door is coupled to the body via a first hinge and rotatable around a horizontal axis. A second door is coupled to the body via a second hinge and rotatable around a vertical axis.

20 Claims, 9 Drawing Sheets

(56) References Cited

U.S. PATENT DOCUMENTS

| | | | | |
|---|---|---|---|---|
| 12,180,766 | B1 * | 12/2024 | Cheringal | E05F 15/40 |
| 12,523,084 | B2 * | 1/2026 | Lee | B60J 5/06 |
| 12,558,945 | B2 * | 2/2026 | Kume | B60J 5/0479 |
| 2005/0116496 | A1 * | 6/2005 | Lowson | E05F 15/63 296/146.11 |
| 2006/0197357 | A1 * | 9/2006 | Catania | E05D 15/58 296/155 |
| 2012/0167468 | A1 * | 7/2012 | Hozumi | E05D 15/58 49/209 |
| 2019/0389388 | A1 * | 12/2019 | Ngo | B60R 3/02 |
| 2021/0402929 | A1 * | 12/2021 | Robinson | B62D 33/0273 |
| 2022/0410674 | A1 * | 12/2022 | Kanasugi | B60J 5/0479 |
| 2023/0391171 | A1 * | 12/2023 | Gitter | B60J 5/062 |
| 2024/0157771 | A1 * | 5/2024 | Plourde, Jr. | B60J 5/0479 |
| 2024/0359750 | A1 * | 10/2024 | Krishnan | B60R 3/02 |

FOREIGN PATENT DOCUMENTS

| | | | | | |
|---|---|---|---|---|---|
| EP | 3501467 | A1 | * | 6/2019 | A61G 3/061 |
| EP | 3501467 | B1 | * | 1/2020 | A61G 3/061 |
| FR | 2968604 | A1 | * | 6/2012 | B60J 5/062 |
| GB | 2408025 | A | * | 5/2005 | B62D 65/00 |
| JP | 6743923 | B2 | * | 8/2020 | |

* cited by examiner

DOOR DESIGNS FOR RECREATIONAL VEHICLES

CROSS REFERENCE TO RELATED APPLICATION

This application claims priority to U.S. Provisional Application No. 63/450,400, filed Mar. 7, 2023, which is herein incorporated by reference in its entirety.

SUMMARY

Certain embodiments of the present disclosure describe various door designs for recreational vehicles (e.g., Class A recreational vehicles; Class B recreational vehicles such as camper vans; Class C recreational vehicles; trailers such as travel trailers, toy haulers, and fifth-wheel trailers; and the like). Some embodiments involve methods for retrofitting a factory chassis with modified door designs, and some of these embodiments involve repurposing or utilizing existing structures (e.g., door tracks) of the factory chassis in connection with modified door designs.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 3A-8B show various door designs for use with recreational vehicles such as the recreational vehicle of FIGS. 1 and 2, in accordance with certain embodiments of the present disclosure. FIGS. 3A and 3B show a first door design of the present disclosure. FIG. 3A shows the doors in respective closed positions, and FIG. 3B shows the doors in respective open positions. FIG. 4A shows the doors in respective closed positions, and FIG. 4B shows the forward doors in respective open positions. FIG. 5A shows the doors in respective closed positions, and FIG. 5B shows the doors in respective open positions. FIG. 6A shows the doors in respective closed positions, and FIG. 6B shows the doors in respective open positions. FIG. 7A shows one or more doors in a closed position, and FIG. 7B shows one or more doors in an open position. FIGS. 8A and 8B show a sixth door design of the present disclosure. FIG. 8A shows a door with a cargo door in a closed position, and FIG. 8B shows the cargo door in an open position.

Figure 1:
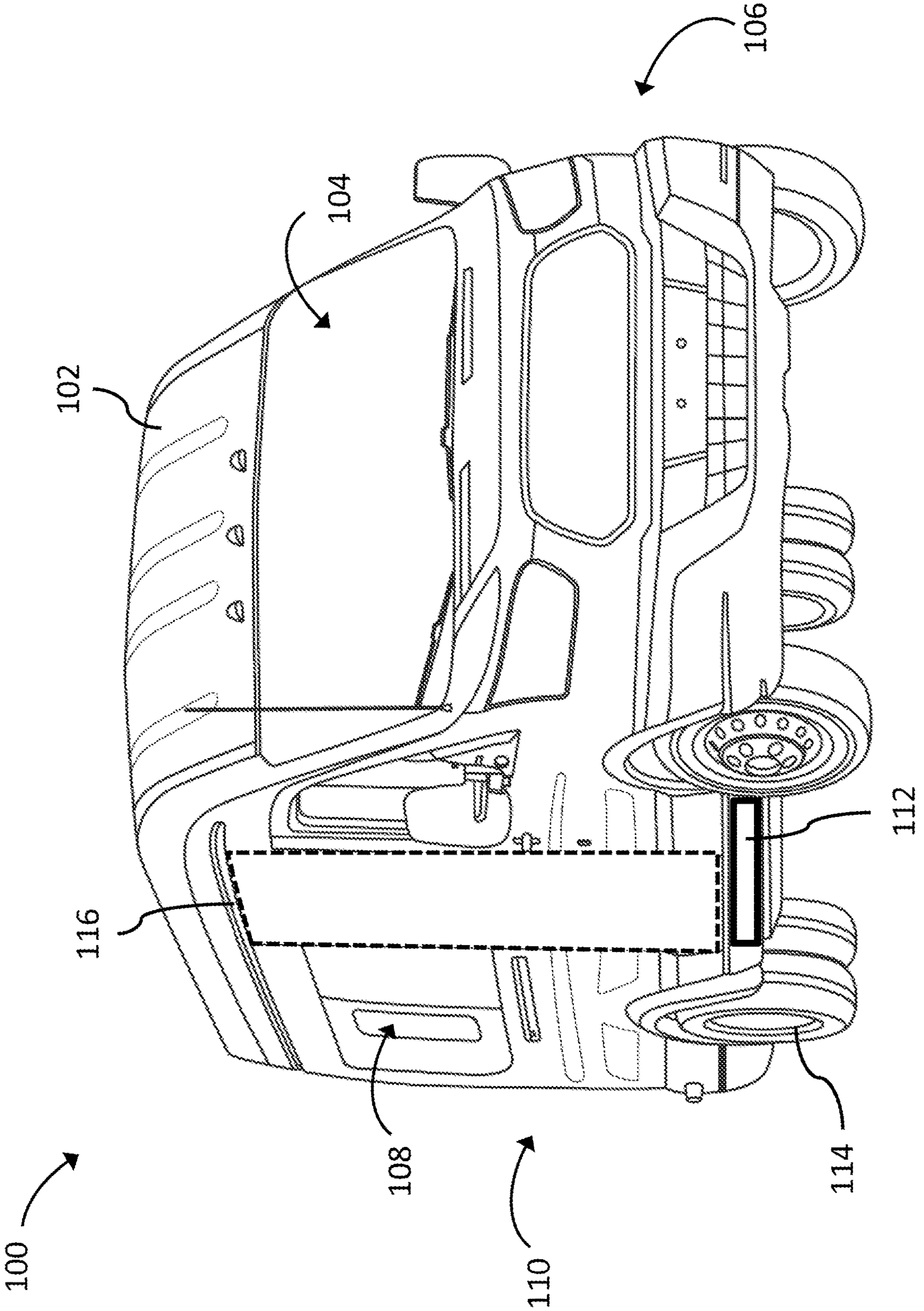
FIG. 1 shows a recreational vehicle, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

The present disclosure features door designs (e.g., entry door designs) for recreational vehicles. In some embodiments, the door designs are implemented by retrofitting a factory chassis by removing the factory door(s) and replacing the factory door(s) with new door designs. Such approaches may involve using existing structures from the factory (e.g., door tracks, B-pillars) as well as customized structures to secure the new doors to the vehicle. In other embodiments, the door designs are implemented using customized structures installed during the original assembly or manufacture of the vehicle.

Although the figures discussed below show what is typically referred to as a Class B recreational vehicle or a camper van, embodiments of the present disclosure can be used in other types of recreational vehicles (e.g., Class A recreational vehicles, Class C recreational vehicles, 5th wheel trailers, travel trailers). Further, features of the various designs described below can be combined with one another and are not necessarily mutually exclusive. For example, one or more features shown in one set of figures could be used in combination with one or more features shown in a different set of figures.

Recreational Vehicles

FIG. 1 shows one example of a type of recreational vehicle 100 that can incorporate the door designs described herein. The recreational vehicle 100 has a body 102 that houses a cab area 104 at a front end 106 of the recreational vehicle 100 and a living space area 108 positioned between the cab area 104 and a rear end 110 of the recreational vehicle 100. The recreational vehicle 100 can include one or more power sources (represented by block 112 for simplicity of illustration) that are operably coupled to (e.g., via a transmission, shafts) front and/or rear axles and that provide the energy to rotate the axle(s) and/or wheels 114 and therefore propel the recreational vehicle 100. The power source 112 can include an engine (e.g., gas engine or diesel engine), rechargeable batteries, fuel cell, or a combination (e.g., hybrid) of an engine and rechargeable batteries, etc.

The body 102 of the recreational vehicle 100 includes an entryway 116 on the passenger side of the body 102 for passengers to enter and exit the living space area 108. The entryway 116 is positioned behind the front passenger door. As described in more detail below, various door designs can be used to cover the entryway 116 and provide functions not available on traditional factory door designs.

Figure 2:
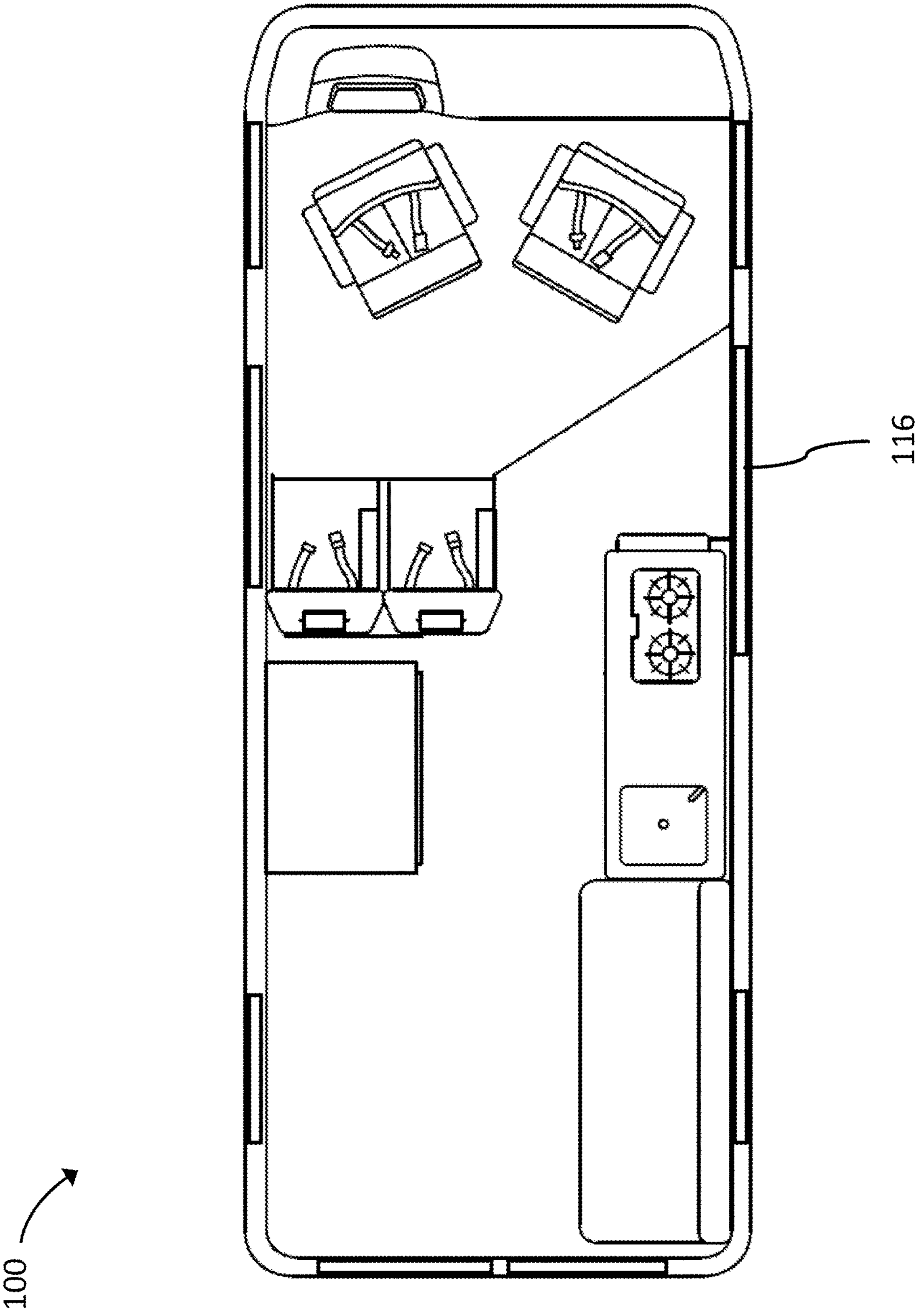
FIG. 2 shows a schematic floor plan of the recreational vehicle of FIG. 1, in accordance with certain embodiments of the present disclosure.

FIG. 2 shows a top-down view of a floorplan of the recreational vehicle 100. The floorplan of FIG. 2 is just one example of a floor plan that can be used with door designs described herein and with recreational vehicles such as the recreational vehicle 100.

Door Designs

Figure 3A:
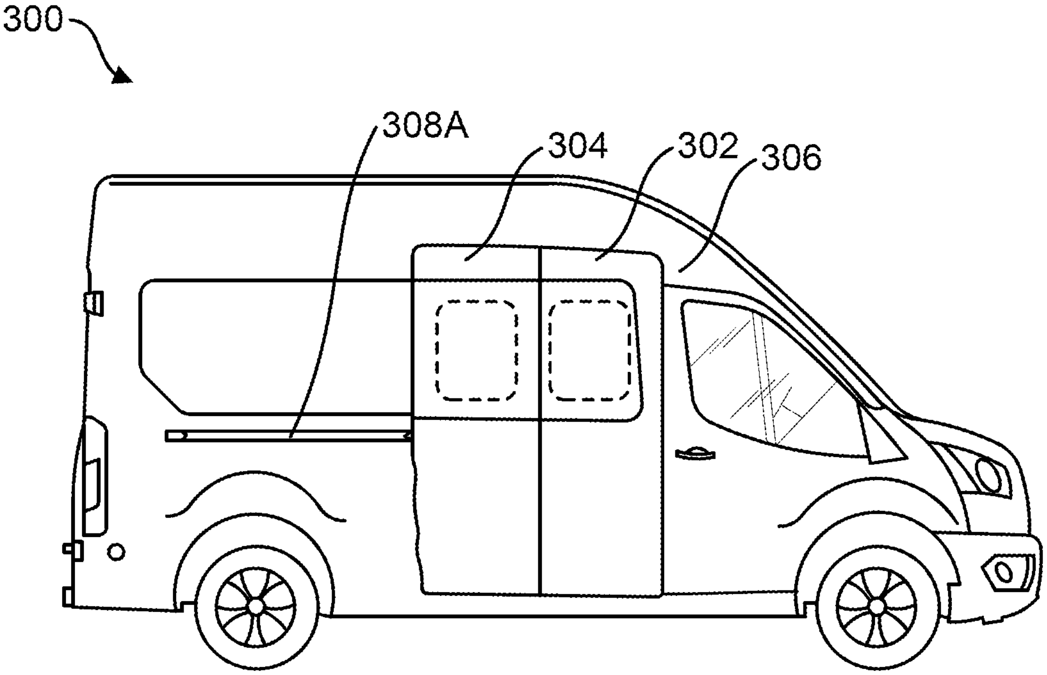
Figure 3B:
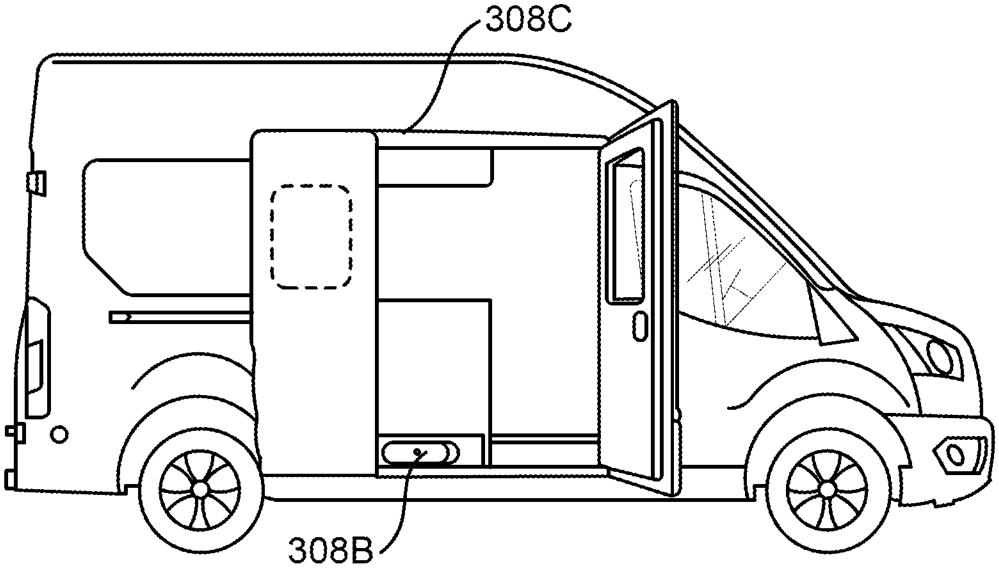

FIGS. 3A and 3B show a first door design of the present disclosure. FIG. 3A shows the doors in respective closed positions, and FIG. 3B shows the doors in respective open positions.

The recreational vehicle 300 includes a first door 302 and a second door 304. When in the closed position shown in FIG. 3A, the first door 302 and the second door 304 are attached to each other (e.g., latched to each other). For example, one or both of the doors can include a handle that a user can pull, rotate, and/or push to latch or unlatch one of the doors to the other door. In certain embodiments, the doors are designed such that the first door 302 needs to be opened (or at least unlatched from the second door 304) before the second door 304 can be opened.

As shown in FIG. 3A, the first door 302 and the second door 304 can have lengths (in the horizontal direction) that are substantially similar to each other such that each door covers approximately half of the entryway opening of the recreational vehicle 300.

The first door 302 is coupled to a pillar 306 of the recreational vehicle 300 such that the first door 302 can be rotated (e.g., pivoted or swung) to the open position. For example, one or more hinges can couple the first door 302 to the pillar 306 to allow the first door 302 to rotate between open and closed positions. The first door 302 can rotate around an axis that extends substantially along a vertical direction.

The second door 304 is a sliding door. The second door 304 is coupled to the body of the recreational vehicle 300 via one or more door tracks 308A (shown in FIG. 3A), 308B (FIG. 3B), and 308C (FIG. 3B). The door tracks 308-308C can include a slot in which a portion of the second door 304 extends through. The second door 304 can include rollers or similar features that fit into respective door tracks 308A-C such that the second door 304 can be slid open and slid closed. In certain embodiments, the one or more door tracks 308A-C are factory door tracks that are utilized for the second door 304 after the original factory sliding door is removed and replaced by the first door 302 and the second door 304. The second door 304 is shorter lengthwise compared to the original factory sliding door. And either or both of the first door 302 and the second door 304 can include windows (shown in dotted lines in FIGS. 3A and 3B).

Figure 4A:
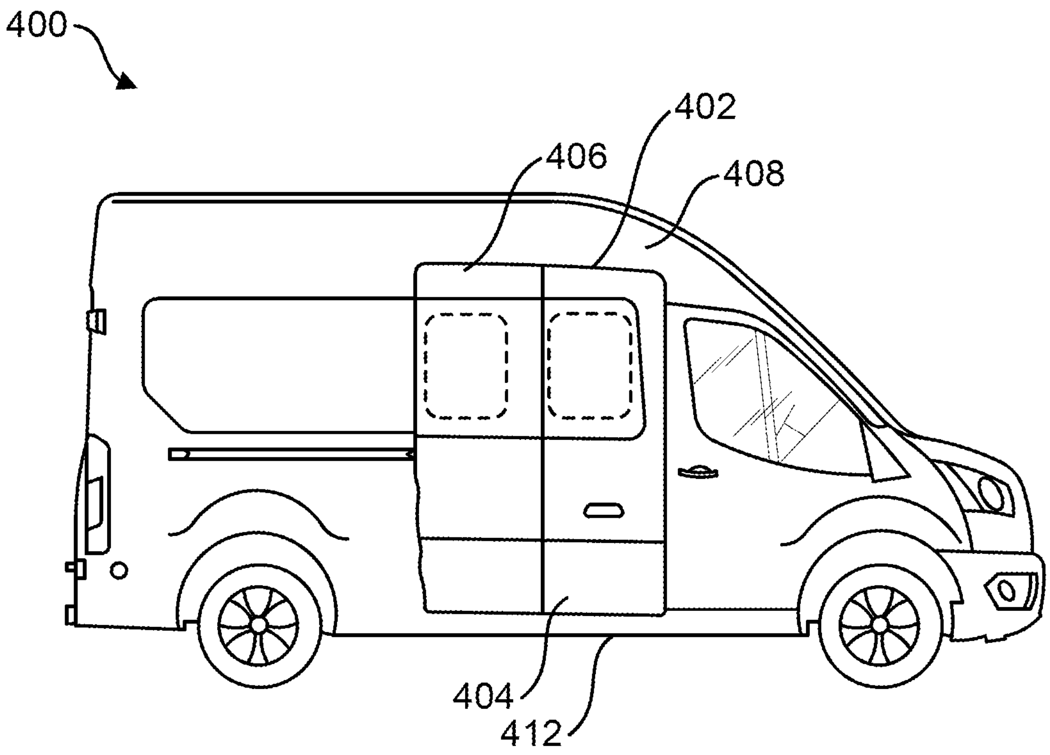
FIGS. 4A and 4B show a second door design of the present disclosure.
Figure 4B:
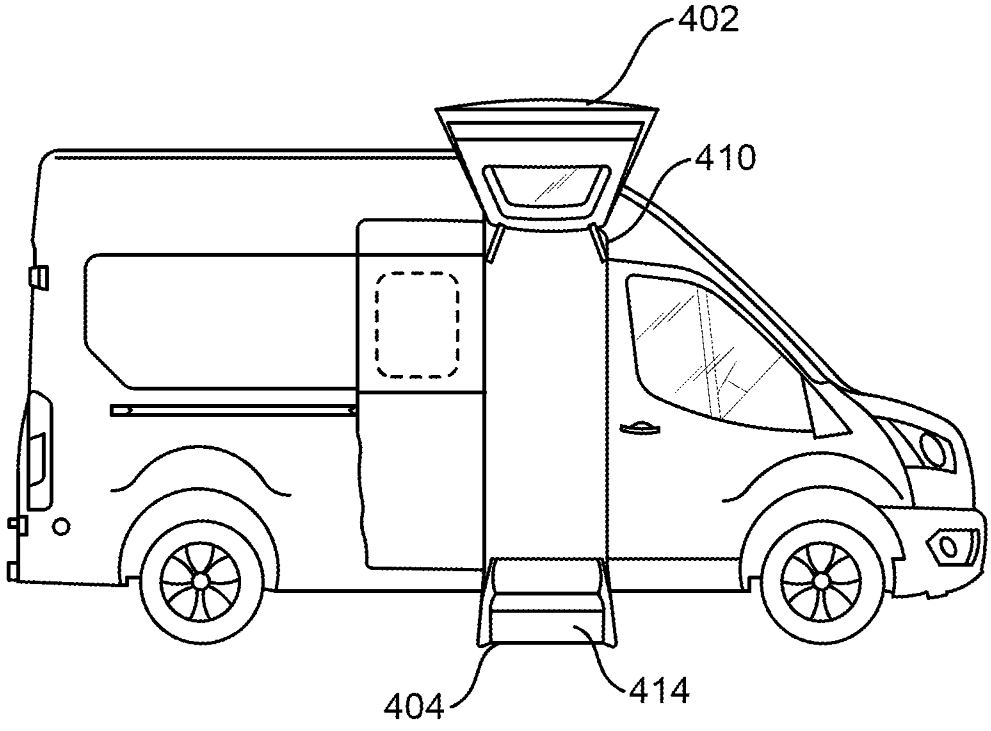

FIGS. 4A and 4B show a second door design of the present disclosure. FIG. 4A shows the doors in respective closed positions, and FIG. 4B shows the forward doors in respective open positions.

The recreational vehicle 400 includes a first door 402 and a second door 404. In certain embodiments, the recreational vehicle 400 includes a third door 406 while in other embodiments a stationary body panel is positioned in place of where the third door 406 is shown in FIGS. 4A and 4B. In embodiments that feature the third door 406, the third door 406 can be a sliding door or a rotatable door.

The first door 402 is positioned above the second door 404. When in the closed position shown in FIG. 4A, the first door 402 and the second door 404 are attached to each other (e.g., latched to each other). For example, one or both of the doors can include a handle that a user can pull, rotate, and/or push to latch or unlatch one of the doors to the other door. In certain embodiments, the doors are designed such that the first door 402 needs to be opened (or at least unlatched from the second door 404) before the second door 404 can be opened.

As shown in FIG. 4A, the first door 402 is longer than the second door 404 in the vertical direction. For example, the first door 402 can have a length in the vertical direction that is approximately twice the length of the second door 404. In the horizontal direction, the first door 402 and the second door 404 can have lengths that are substantially similar to each other.

The first door 402 is coupled to an upper portion 408 (e.g., an upper frame, a ceiling) of the recreational vehicle 400 such that the first door 402 can be rotated (e.g., pivoted or swung) to the open position. For example, one or more hinges can couple the first door 402 (at a first end of the first door 402) to the upper portion 408 to allow the first door 402 to rotate between open and closed positions. As the first door 402 moves from the closed position to the open position, a second end of the first door 402 rotates with respect to the one or more hinges approximately 90 degrees (e.g., 90 degrees+/−10 degrees). In certain embodiments, one or more assist devices 410 (e.g., motors, actuators, struts such as gas struts) are coupled to the first door 402 such that opening and/or closing the first door 402 requires less force from a user.

The second door 404 is coupled to a lower portion 412 (e.g., a lower frame, a floor) of the recreational vehicle 400 such that the second door 404 can be rotated (e.g., pivoted or swung) to the open position. For example, one or more hinges can couple the second door 404 (at a first end of the second door 404) to the lower portion 412 to allow the second door 404 to rotate between open and closed positions. As the second door 404 moves from the closed position to the open position, a second end of the second door 404 rotates with respect to the one or more hinges such that the second door 404 either touches the ground or hovers above the ground. In certain embodiments, the second door 404 rotates between 90 and 180 degrees such as approximately 125 degrees (e.g., 125 degrees+/−10 degrees). In certain embodiments, one or more assist devices (e.g., motors, actuators, struts such as gas struts) are coupled to the second door 404 such that opening and/or closing the second door 404 requires less force from a user.

The second door 404 can include one or more steps 414. When the second door 404 is closed, the steps 414 are positioned within the recreational vehicle 400 and face the interior of the recreational vehicle 400. The steps 414 help passengers with entering or exiting the recreational vehicle 400. In other embodiments, the second door 404 includes a ramp instead of steps such so that passengers can use a wheelchair to enter and exit the recreational vehicle 400.

Figure 5A:
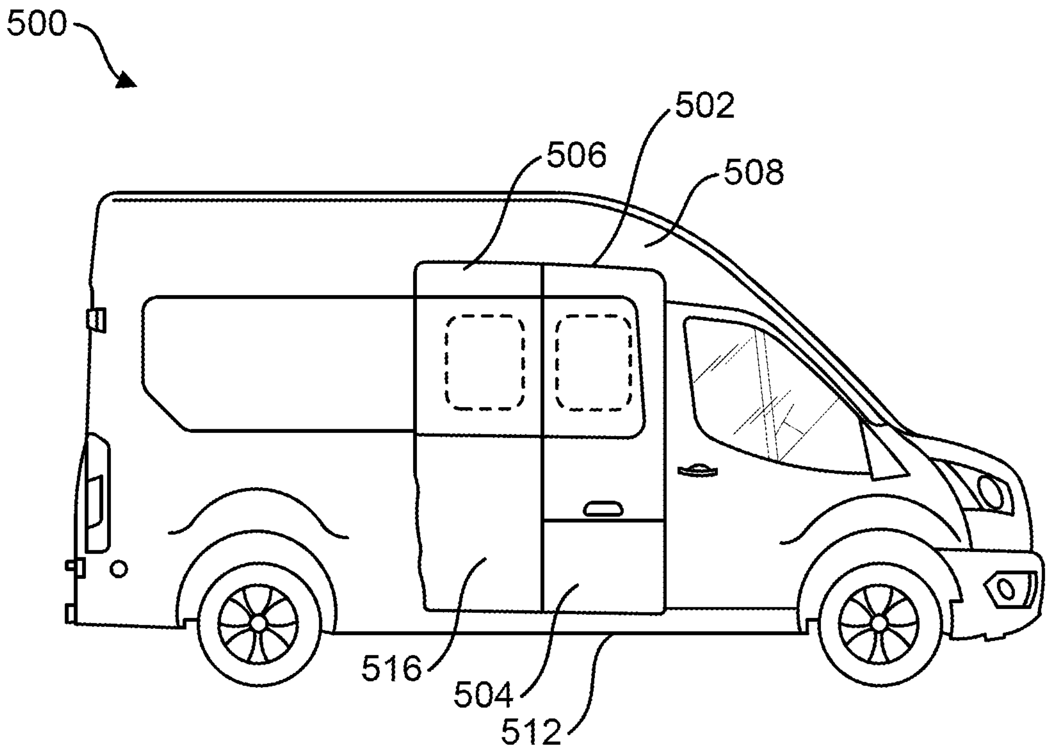
FIGS. 5A and 5B show a third door design of the present disclosure.
Figure 5B:
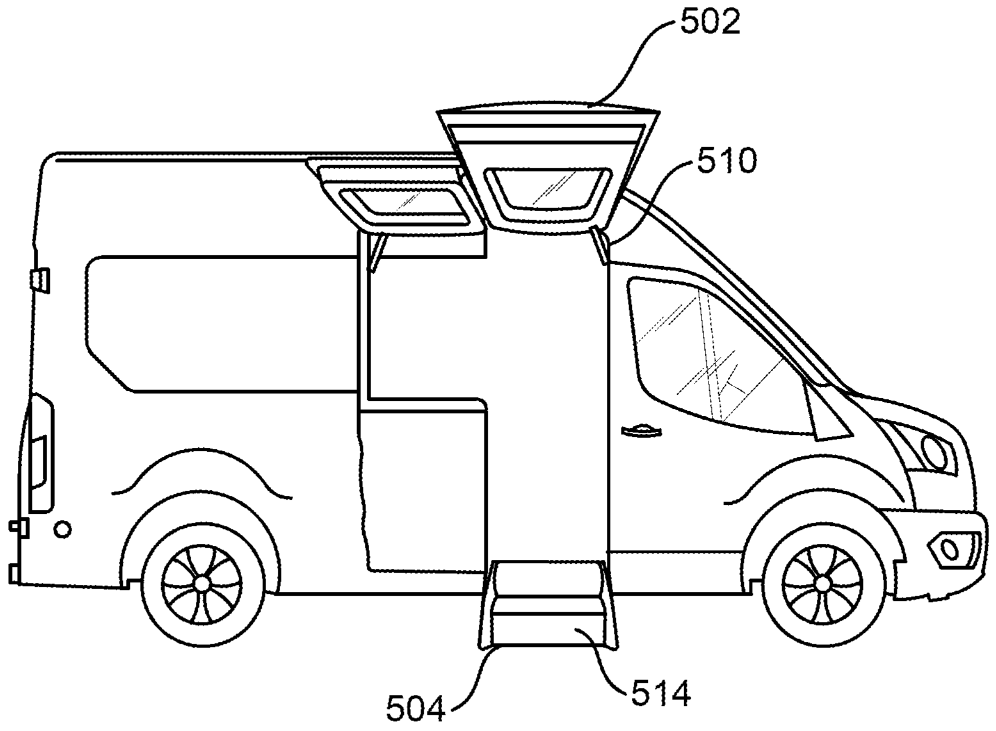

FIGS. 5A and 5B show a third door design of the present disclosure. FIG. 5A shows the doors in respective closed positions, and FIG. 5B shows the doors in respective open positions. The third door design is similar to the second door design but utilizes a single third upper door. The recreational vehicle 500 includes a first door 502, a second door 504, and a third door 506.

The first door 502 is positioned above the second door 504. When in the closed position shown in FIG. 5A, the first door 502 and the second door 504 are attached to each other (e.g., latched to each other). For example, one or both of the doors can include a handle that a user can pull, rotate, and/or push to latch or unlatch one of the doors to the other door. In certain embodiments, the doors are designed such that the first door 502 needs to be opened (or at least unlatched from the second door 504) before the second door 504 can be opened.

As shown in FIG. 5A, the first door 502 is longer than the second door 504 in the vertical direction. For example, the first door 502 can have a length in the vertical direction that is approximately twice the length of the second door 504. In the horizontal direction, the first door 502 and the second door 504 can have lengths that are substantially similar to each other.

The first door 502 is coupled to an upper portion 508 (e.g., an upper frame, a ceiling) of the recreational vehicle 500 such that the first door 502 can be rotated (e.g., pivoted or swung) to the open position. For example, one or more hinges can couple the first door 502 (at a first end of the first door 502) to the upper portion 508 to allow the first door 502 to rotate between open and closed positions. As the first door 502 moves from the closed position to the open position, a second end of the first door 502 rotates with respect to the one or more hinges approximately 90 degrees (e.g., 90 degrees+/−10 degrees). In certain embodiments, one or more assist devices 510 (e.g., motors, actuators, struts such as gas struts) are coupled to the first door 502 such that opening and/or closing the first door 502 requires less force from a user.

The second door 504 is coupled to a lower portion 512 (e.g., a lower frame, a floor) of the recreational vehicle 500 such that the second door 504 can be rotated (e.g., pivoted or swung) to the open position. For example, one or more hinges can couple the second door 504 (at a first end of the second door 404) to the lower portion 512 to allow the second door 504 to rotate between open and closed positions. As the second door 504 moves from the closed position to the open position, a second end of the second door 504 rotates with respect to the one or more hinges such that the second door 504 either touches the ground or hovers above the ground. In certain embodiments, the second door 504 rotates between 90 and 180 degrees such as approximately 125 degrees (e.g., 125 degrees+/−10 degrees). In certain embodiments, one or more assist devices (e.g., motors, actuators, struts such as gas struts) are coupled to the second door 504 such that opening and/or closing the second door 504 requires less force from a user.

The second door 504 includes one or more steps 514. When the second door 504 is closed, the steps 514 are positioned within the recreational vehicle 500 and face the interior of the recreational vehicle 500. The steps 514 help passengers with entering or exiting the recreational vehicle 500. In other embodiments, the second door 404 includes a ramp instead of steps such so that passengers can use a wheelchair to enter and exit the recreational vehicle 400.

The third door 506 is positioned above a stationary panel 516 and can be coupled to the upper portion 508 of the recreational vehicle 500 such that the third door 506 can be rotated (e.g., pivoted or swung) to the open position. For example, one or more hinges can couple the third door 506 (at a first end of the third door 506) to the upper portion 508 to allow the third door 506 to rotate between open and closed positions. The third door 506 can be latched to the stationary panel 516 in the closed position and unlatched to move to the open position. For example, the third door 506 can include a handle, latch, etc. that is used to unlatch the third door 506 from the stationary panel 516.

As the third door 506 moves from the closed position to the open position, a second end of the third door 506 rotates with respect to the one or more hinges approximately 90 degrees (e.g., 90 degrees+/−10 degrees). In certain embodiments, one or more assist devices (e.g., motors, actuators, struts such as gas struts) are coupled to the third door 506 such that opening and/or closing the third door 506 requires less force from a user.

When in the open position, the third door 506 (and the first door 502) can function similar to an awning and provide shelter from rain and/or shade. The third door 506 can be positioned above a kitchen area of the recreational vehicle 500. For example, a stovetop or countertop can be positioned immediately behind the stationary panel 516.

Figure 6A:
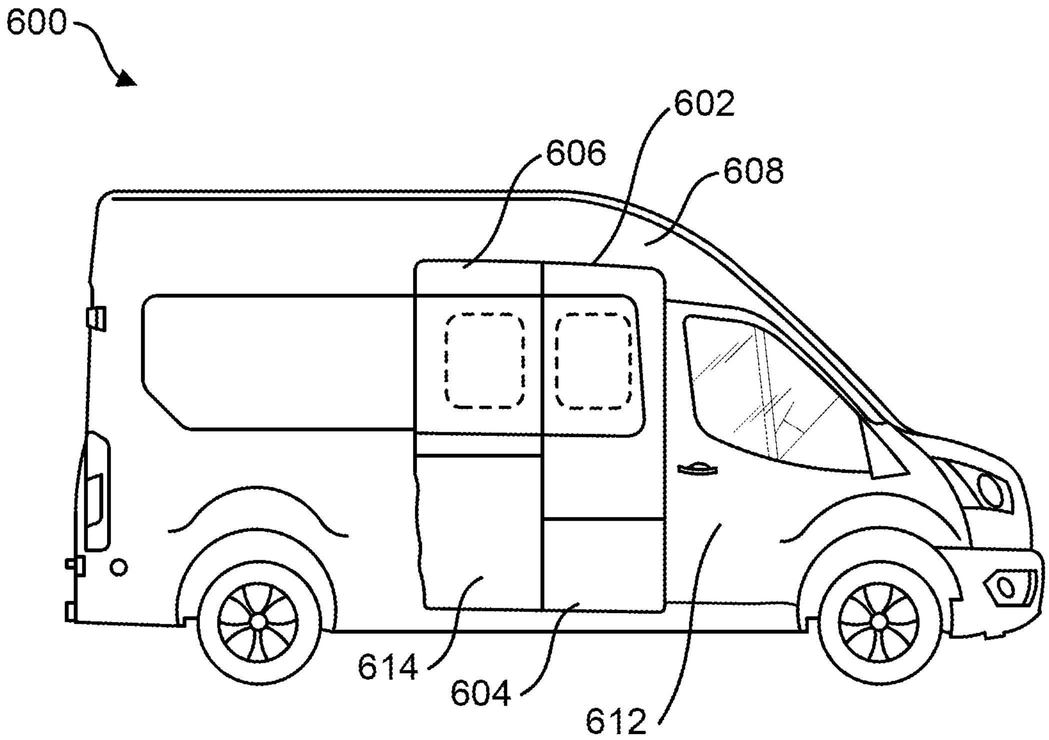
FIGS. 6A and 6B show a fourth door design of the present disclosure.
Figure 6B:
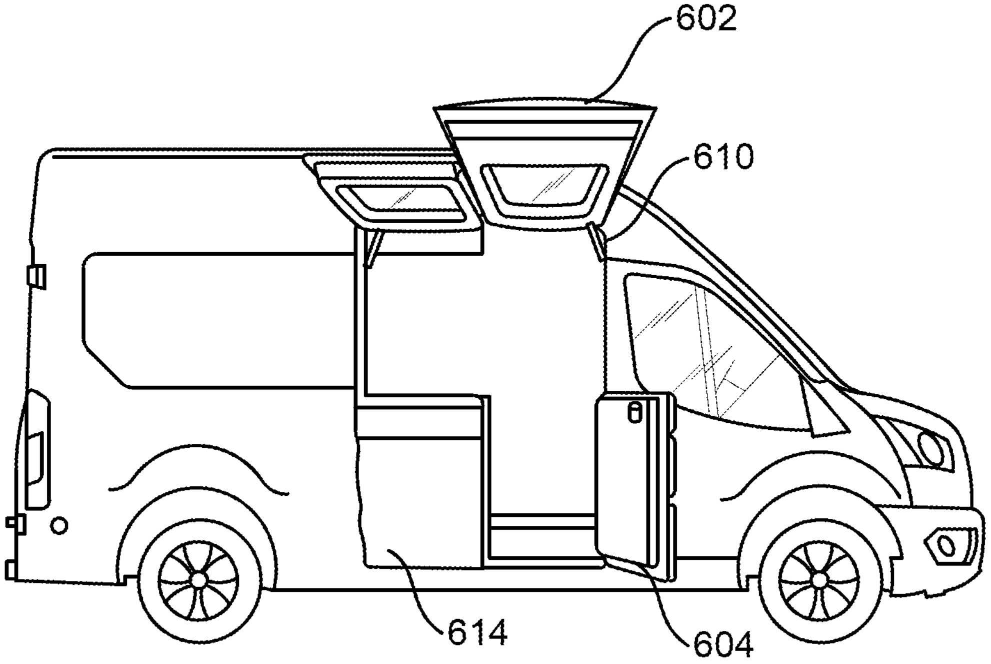

FIGS. 6A and 6B show a fourth door design of the present disclosure. FIG. 6A shows the doors in respective closed positions, and FIG. 6B shows the doors in respective open positions. The fourth door design is similar to the third door design but utilizes a second door that opens around a vertical axis instead of a horizontal axis. The recreational vehicle 600 includes a first door 602, a second door 604, and a third door 606.

The first door 602 is positioned above the second door 604. When in the closed position shown in FIG. 6A, the first door 602 and the second door 604 are attached to each other (e.g., latched to each other). For example, one or both of the doors can include a handle that a user can pull, rotate, and/or push to latch or unlatch one of the doors to the other door. In certain embodiments, the doors are designed such that the first door 602 needs to be opened (or at least unlatched from the second door 604) before the second door 604 can be opened.

As shown in FIG. 6A, the first door 602 and the second door 604 can have lengths (in the horizontal direction) that are substantially similar to each other such that each door covers approximately half of the entryway opening of the recreational vehicle 600. Further, in the vertical direction, the first door 602 and the second door 604 can have lengths that are substantially similar to each other.

The first door 602 is coupled to an upper portion 608 (e.g., an upper frame, a ceiling) of the recreational vehicle 600 such that the first door 602 can be rotated (e.g., pivoted or swung) to the open position. For example, one or more hinges can couple the first door 602 (at a first end of the first door 602) to the upper portion 608 to allow the first door 602 to rotate between open and closed positions. As the first door 602 moves from the closed position to the open position, a second end of the first door 602 rotates with respect to the one or more hinges approximately 90 degrees (e.g., 90 degrees+/−10 degrees). In certain embodiments, one or more assist devices 610 (e.g., motors, actuators, struts such as gas struts) are coupled to the first door 602 such that opening and/or closing the first door 602 requires less force from a user.

The second door 604 is coupled to a pillar 612 of the recreational vehicle 600 such that the second door 604 can be rotated (e.g., pivoted or swung) to the open position. For example, one or more hinges can couple the second door 604 to the pillar 612 to allow the second door 604 to rotate between open and closed positions. The second door 604 can rotate around an axis that extends substantially along a vertical direction. When in the closed position, the second door 604 can be latched to a stationary panel 614.

The third door 606 is positioned above the stationary panel 614 and can be coupled to the upper portion 608 of the recreational vehicle 600 such that the third door 606 can be rotated (e.g., pivoted or swung) to the open position. For example, one or more hinges can couple the third door 606 (at a first end of the third door 606) to the upper portion 608 to allow the third door 606 to rotate between open and closed positions. The third door 606 can be latched to the stationary panel 616 in the closed position and unlatched to move to the open position. For example, the third door 606 can include a handle, latch, etc. that is used to unlatch the third door 606 from the stationary panel 614.

As the third door 606 moves from the closed position to the open position, a second end of the third door 606 rotates with respect to the one or more hinges approximately 90 degrees (e.g., 90 degrees+/−10 degrees). In certain embodiments, one or more assist devices (e.g., motors, actuators, struts such as gas struts) are coupled to the third door 606 such that opening and/or closing the third door 606 requires less force from a user.

Figure 7A:
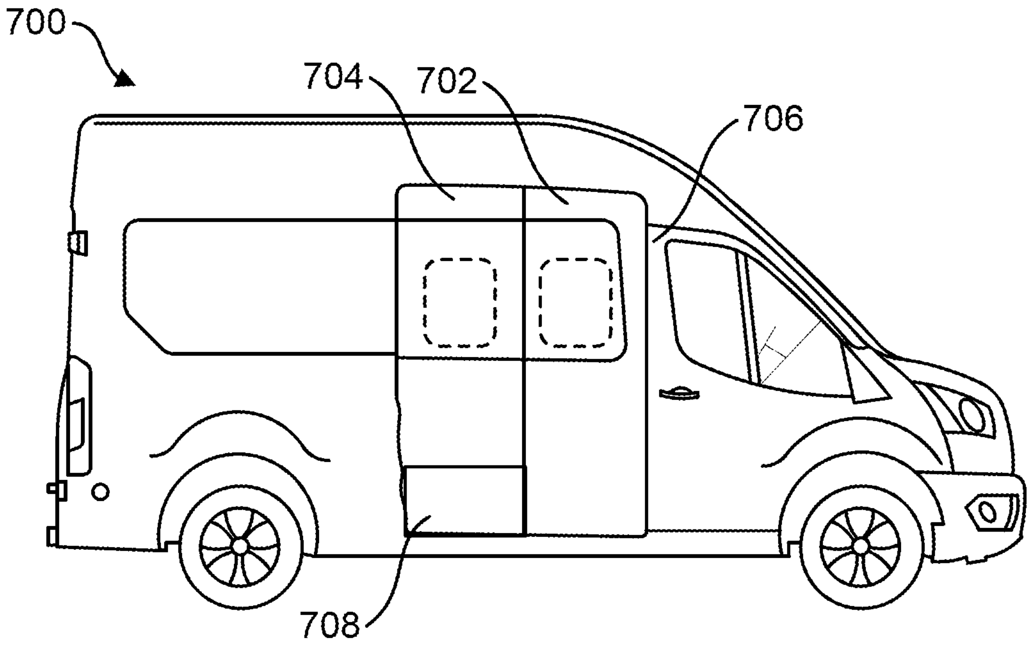
FIGS. 7A and 7B show a fifth door design of the present disclosure.
Figure 7B:
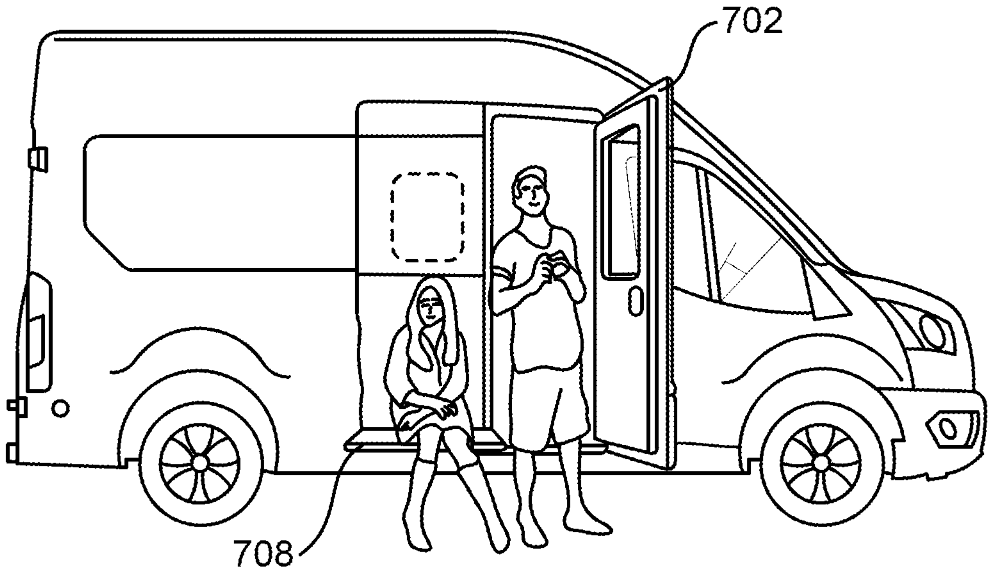

FIGS. 7A and 7B show a fifth door design of the present disclosure. FIG. 7A shows one or more doors in a closed position, and FIG. 7B shows one or more doors in an open position.

The recreational vehicle 700 can include a first door 702 and a second door 704—although in certain embodiments a stationary panel is used in place of the second door 704. When in the closed position shown in FIG. 7A, the first door 702 and the second door 704 (or stationary panel) are attached to each other (e.g., latched to each other). For example, one or both of the doors can include a handle that a user can pull, rotate, and/or push to latch or unlatch one of the doors to the other door. In certain embodiments, the doors are designed such that the first door 702 needs to be opened (or at least unlatched from the second door 704) before the second door 704 can be opened.

The first door 702 is coupled to a pillar 706 of the recreational vehicle 700 such that the first door 702 can be rotated (e.g., pivoted or swung) to the open position. For example, one or more hinges can couple the first door 702 to the pillar 706 to allow the first door 702 to rotate between open and closed positions. The first door 702 can rotate around an axis that extends substantially along a vertical direction.

The second door 704 (or stationary panel) includes a bench assembly 708. The bench assembly 708 can rotate between a closed position (shown in FIG. 7A) and an open or seating position (shown in FIG. 7B). For example, the bench assembly 708 can include a panel that can fold open (e.g., approximately 90 degrees) to provide a surface on which a person can sit or on which items can be set/supported. The panel can be coupled to the body of the recreational vehicle 700 via one or more hinges (or similar mechanisms) such that the panel can rotate around a substantially horizontal axis to open and close. The bench assembly 708 can include a handle and latch to disengage part of the panel from the body of the recreational vehicle 700 to allow the panel to rotate to the open position. The bench assembly 708 can also include one or more wires, straps, structs, etc., that are coupled between the free end of the panel and the body of the recreational vehicle 700 to provide structural support. In certain embodiments, the bench assembly 708 incorporates exterior cladding such that the recreational vehicle 700 maintains its original look.

Figure 8A:
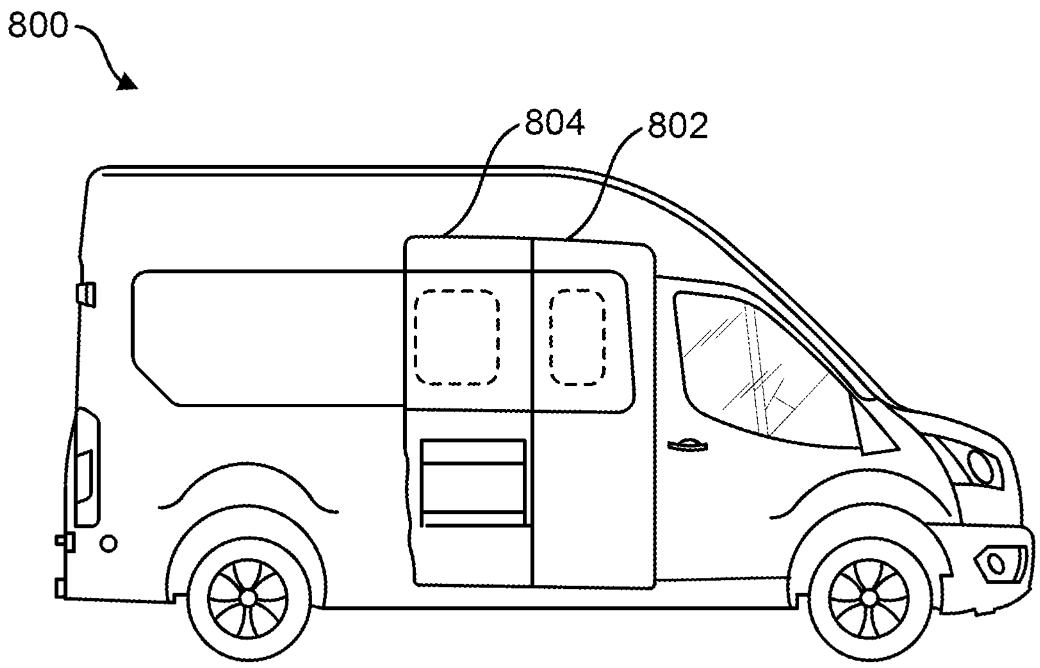
Figure 8B:
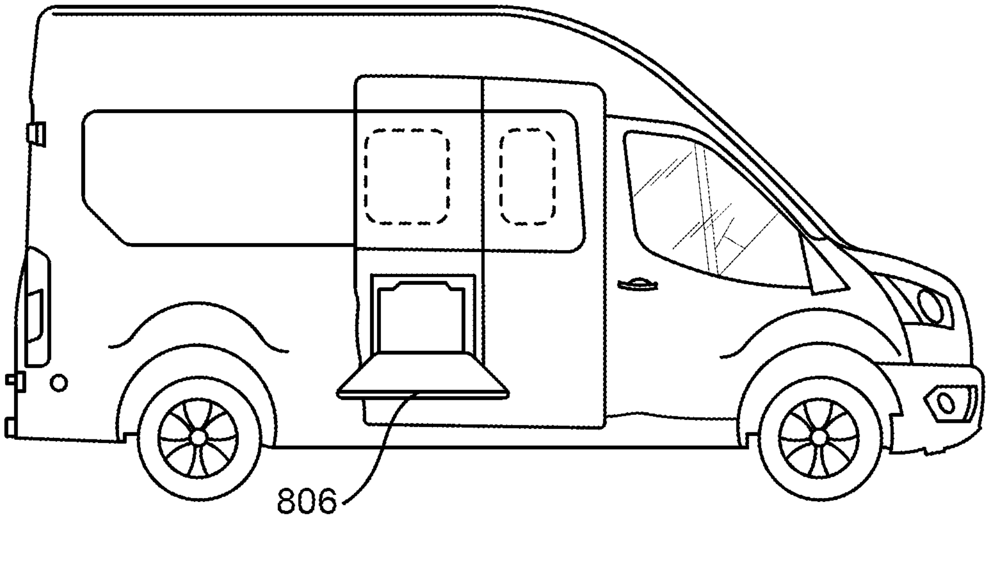

FIGS. 8A and 8B show a sixth door design of the present disclosure. The recreational vehicle 800 includes a first door 802 and a second door 804—although in certain embodiments a stationary panel is used in place of the second door 804. The first door 802 and the second door 804 (or stationary panel) can incorporate the various door designs described above; however, in FIGS. 8A and 8B, the second door 804 (or stationary panel) includes an opening through which items can be passed.

The second door 804 (or stationary panel) includes a cargo door 806 that can rotate between a closed position (shown in FIG. 8A) and an open position (shown in FIG. 8B) to expose an opening through the door or panel. For example, the cargo door 806 can rotate open (e.g., approximately 90 degrees) to expose the opening and/or to provide a surface on which items can be set/supported. The cargo door 806 can be coupled to the second door 804 (or stationary panel) via one or more hinges (or similar mechanisms) such that the cargo door 806 can rotate around a substantially horizontal axis to open and close. The cargo door 806 can include a handle and latch to disengage part of the cargo door 806 from the second door 804 (or stationary panel) to allow the cargo door 806 to rotate to the open position. The cargo door 806 can also include one or more wires, straps, structs, etc., that are coupled between the free end of the cargo door 806 and the second door 804 (or stationary panel) to provide structural support.

Figure 9:
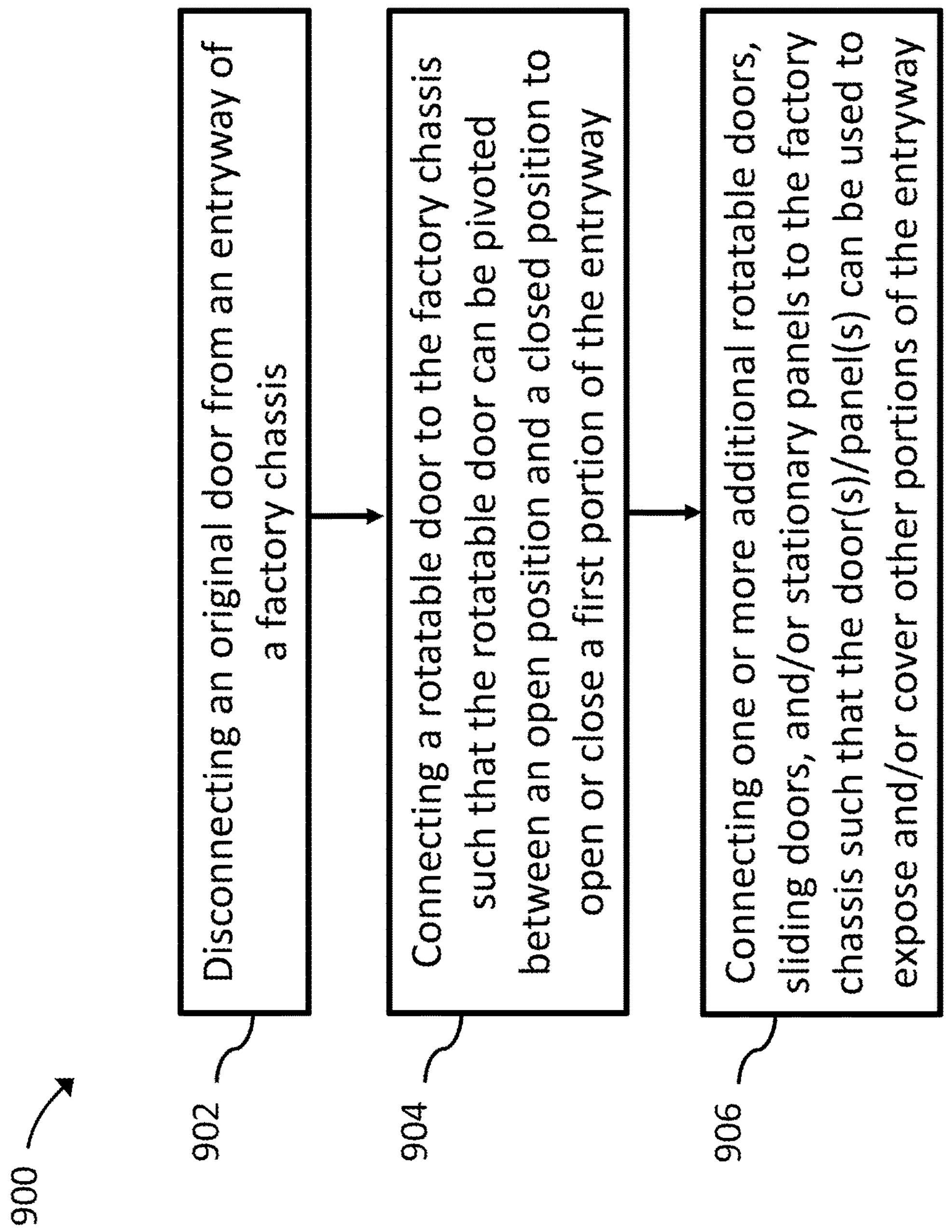
FIG. 9 shows a block diagram outlining steps of a method of manufacturing a recreational vehicle with one or more of the various door designs described herein, in accordance with certain embodiments of the present disclosure.

FIG. 9 outlines steps of a method 900 for incorporating one or more of the various door designs described above onto a factory chassis of a vehicle.

The method 900 includes removing an original door from an entryway of the factory chassis (block 902 in FIG. 9). In certain embodiments, the original door is a sliding door that utilized one or more door tracks for sliding between open and closed positions. Removing the original door—in contrast to simply opening the door—includes completely decoupling the original door from the factory chassis.

The method 900 further includes connecting a first rotatable door to the factory chassis such that the first rotatable door can be pivoted between a first open position and a first closed position to open or close a first portion of the entryway (block 904 in FIG. 9). In some embodiments, the first rotatable door is coupled to the factory chassis such that the first rotatable door pivots around a vertical axis. In other embodiments, the rotatable door is coupled to the factory chassis such that the first rotatable door pivots around a horizontal axis (e.g., a gullwing-like door).

The method 900 further includes one or more of the following: (a) adding a new, shorter sliding door to the factory chassis such that the new sliding door can be slid between a second open position and a second closed position to open or close a second portion of the entryway, (b) adding second rotatable door to the factory chassis such that the second rotatable door can be moved between a second open position and a second closed position to open or close a second portion of the entryway, (c) adding second and third rotatable doors to the factory chassis such that the second and third rotatable doors can be moved between respective open and closed positions to open or close respective portions of the entryway, or (d) adding a stationary panel to the factory chassis to cover a second portion of the entryway and including a folding panel to the stationary panel.

In certain embodiments, the recreational vehicle is based on a Ford Transit van (or similar vehicle) that is modified to include one or more door designs described above. For example, the factory chassis can be a Ford Transit van chassis and the original door can be a sliding door originally installed on the van chassis.

In certain embodiments, the various doors described above can include a window.

In certain embodiments, the various doors described above are coupled to motors such that the doors can be slid open/closed or rotated open/closed automatically in response to a user command (e.g., a user pressing a button).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

I claim:

1. A method for assembling a new door design onto a factory chassis of a vehicle, the method comprising:

disconnecting an original sliding door from the factory chassis, wherein the original sliding door was used to cover an entryway of the vehicle;

connecting a first door to the factory chassis such that the first door can be pivoted between a first open position and a first closed position to open or close a first portion of the entryway; and connecting a second door to the factory chassis such that the second door can be slid or pivoted between a second open position and a second closed position to open or close a second portion of the entryway.

2. The method of claim 1, wherein the factory chassis includes a door track, wherein second door is a new sliding door that utilizes the door track to slide between the second open position and the second closed position.

3. The method of claim 2, wherein the new sliding door is shorter than the original sliding door along a horizontal axis.

4. The method of claim 1, wherein the connecting the first door includes connecting the first door to an upper frame of the recreational vehicle such that the first door can rotate around a first horizontal axis, wherein the connecting the second door includes connecting the second door to a lower frame such that the second door can rotate around a second horizontal axis.

5. The method of claim 4, wherein the second door includes steps.

6. The method of claim 4, further comprising:

connecting a third door to the upper frame of the recreational vehicle such that the third door can rotate around a third horizontal axis between a third open position and a third closed position to open or close a third portion of the entryway.

7. The method of claim 6, further comprising:

connecting a stationary panel to the factory chassis below the third door to cover a fourth portion of the entryway.

8. The method of claim 1, wherein the connecting the first door includes connecting the first door to an upper frame of the recreational vehicle such that the first door can rotate around a first horizontal axis, wherein the connecting the second door includes connecting the second door to a pillar such that the second door can rotate around a vertical axis.

9. The method of claim 8, further comprising:

connecting a third door to the upper frame of the recreational vehicle such that the third door can rotate around a third horizontal axis between a third open position and a third closed position to open or close a third portion of the entryway.

10. A recreational vehicle comprising:

a body with an entryway to an interior of the recreational vehicle;

a rechargeable battery configured to provide energy to propel the recreational vehicle;

a first door coupled to the body via a first hinge, wherein the first door is rotatable around a horizontal axis such that the first door can rotate between a first closed position to cover a first portion of the entryway and a first open position; and a second door coupled to the body via a second hinge, wherein the second door is rotatable around a vertical axis such that the second door can rotate between a second closed position to cover a second portion of the entryway and a second open position, wherein the second door is positioned immediately below the first door.

11. The recreational vehicle of claim 10, wherein the first door and the second door are arranged such that the first door needs to open before the second door can be opened.

12. The recreational vehicle of claim 10, wherein the first door rotates approximately 90 degrees between the first open position and the first closed position.

13. The recreational vehicle of claim 10, further comprising:

a strut coupled to the first door to provide assistance when rotating the first door from the first closed position to the first open position.

14. The recreational vehicle of claim 13, wherein the strut is a gas strut.

15. The recreational vehicle of claim 10, wherein the second door is arranged to latch to the body on an opposite side of the second door from the second hinge.

16. The recreational vehicle of claim 10, wherein the body extends between a front end and a back end, the recreational vehicle further comprising:

a window positioned between the entryway and the back end.

17. The recreational vehicle of claim 10, further comprising:

a third door coupled to the body via a third hinge, wherein the third door is rotatable around a second horizontal axis such that the third door can rotate between a third closed position and a third open position.

18. The recreational vehicle of claim 17, wherein the third door rotates approximately 90 degrees between the third open position and the third closed position.

19. The recreational vehicle of claim 17, further comprising:

a strut coupled to the third door to provide assistance when rotating the third door from the third closed position to the third open position.

20. A recreational vehicle comprising:

a body with an entryway to an interior of the recreational vehicle;

a rechargeable battery configured to provide energy to propel the recreational vehicle;

a first door coupled to the body via a first hinge, wherein the first door is rotatable around a horizontal axis such that the first door can rotate between a first closed position to cover a first portion of the entryway and a first open position;

a strut coupled to the first door to provide assistance when rotating the first door from the first closed position to the first open position; and a second door coupled to the body via a second hinge, wherein the second door is rotatable around a vertical axis such that the second door can rotate between a second closed position to cover a second portion of the entryway and a second open position, wherein the second door is positioned immediately below the first door, wherein the first door and the second door are arranged such that the first door needs to open before the second door can be opened, wherein the second door is arranged to latch to the body on an opposite side of the second door from the second hinge.

* * * * *